(12) United States Patent
Yokoyama et al.

(10) Patent No.: US 6,542,701 B2
(45) Date of Patent: Apr. 1, 2003

(54) CAMERA

(75) Inventors: Kunio Yokoyama, Hino (JP); Yuji Kobayashi, Hachioji (JP); Hitoshi Yagi, Yamanashi (JP)

(73) Assignee: Olympus Optical Co., Ltd., Tokyo (JP)

( * ) Notice: Subject to any disclaimer, the term of this patent is extended or adjusted under 35 U.S.C. 154(b) by 26 days.

(21) Appl. No.: 09/840,222

(22) Filed: Apr. 23, 2001

(65) Prior Publication Data

US 2001/0033749 A1 Oct. 25, 2001

(30) Foreign Application Priority Data

Apr. 25, 2000 (JP) .......................................... 2000-124584
Mar. 13, 2001 (JP) .......................................... 2001-070852

(51) Int. Cl.$^7$ ............................................. G03B 17/02
(52) U.S. Cl. ..................... 396/535; 396/538; 396/539
(58) Field of Search ............................... 396/535, 538, 396/539, 25, 6, 448; 359/511

(56) References Cited

U.S. PATENT DOCUMENTS 2,566,267 A * 8/1951 Wallace ..................... 396/512
5,842,072 A * 11/1998 Zander et al. ............. 396/535

* cited by examiner

Primary Examiner—David M. Gray
Assistant Examiner—Rochelle Blackman
(74) Attorney, Agent, or Firm—Frishauf, Holtz, Goodman & Chick, P.C.

(57) ABSTRACT

This camera is a camera having a compartment for loading and storing various members with a predetermined sheet member attached along the inner wall face of the compartment, in which the sheet member is attached at a predetermined position by a very easy and inexpensive means while assuring good operability during the assembly operation and the disassembly operation, comprising a camera main body where an aperture section is formed at a visible position and a sheet member which is attached by elastic deformation without gluing for covering the aperture section, to be attached/removed easily. With such construction, a camera which can contribute to making the manufacturing process efficient and decreasing the manufacturing cost can be provided.

19 Claims, 8 Drawing Sheets

CAMERA

This application claims benefit of Japanese Application No. 2000-124584 filed on Apr. 25, 2000, and No. 2001-070852 filed on Mar. 13, 2001, the entire disclosures of which are incorporated herein by reference.

BACKGROUND OF THE INVENTION

1. Field of the Invention

The present invention relates to a camera, and more particularly to a camera comprising means for covering an aperture portion and convex/concave portion formed at visible positions.

2. Description of the Related Art

A conventional camera for photography has various compartments to set and store various members at predetermined locations in a camera main body. The compartments to store various members here include:

- a battery compartment for storing power supply batteries to drive various electronic circuits for photo taking,
- a film cartridge compartment for storing a film cartridge where rolled film for photo taking is stored, and
- a spool compartment, for storing an exposed part of rolled film drawn out of the film cartridge, which is rolled and stored maintaining a tight roll.

Of these members to be set and stored in various compartments, the above mentioned power supply battery and film cartridge are generally formed in roughly a cylindrical shape. The battery compartment and film cartridge compartment also normally have roughly a cylindrical shape, where the inner wall face has roughly a curved shape. The above mentioned film cartridge compartment is generally formed to have roughly a cylindrical shape, which is the optimum shape to house a rolled film.

A conventional camera, on the other hand, is normally structured such that the outside of the camera main body is covered with such outer members as a front side cover member and rear side cover member. And the various above mentioned compartments are formed by devising the internal shape of the camera main body and outer members.

FIG. 13 is an enlarged cross-sectional view depicting only the portion around the battery compartment in a conventional camera. As FIG. 13 shows, in a conventional camera 100, the walls 103a and 103b of the various compartments, such as film cartridge compartment 121 and battery compartment 109, are formed by devising the internal shape of the camera main body member 103 and the outer members (front side cover member 101, rear side cover member 102, back face cover member, etc.) so that predetermined spaces are formed. And on the inner wall faces of the various compartments formed in this way, various holes and convex/concave portions required for various functions, exist. To cover the various holes and convex/concave portions and to form an appearance for the inner wall faces of the compartments, a sheet member (protective sheet) 120 may be disposed along the inner wall faces. In this case, the sheet member (protective sheet) 120 is normally secured to the inner wall faces of the compartments by such means as gluing.

As FIG. 13 shows, various members such as a battery contact piece 106 are disposed in the battery compartment 109. The battery compartment 109 is formed so that the aperture thereof is freely opened and closed by the battery compartment cover 104. This battery compartment cover 104 is disposed on the side face of the camera 100, for example, and is disposed to be pivoted by the spindle 105 which is disposed so as to rotate in the arrow X direction in FIG. 13, with respect to the rear side cover member 102. By this, the battery compartment cover 104 opens/closes the aperture of the battery compartment 109, and when the cover 104 is in the closed position, the cover 104 constitutes a part of the battery compartment 109. The state shown in FIG. 13 is the state when the battery compartment cover 104 is at the open position where the battery compartment 109 is opened.

Various information may be indicated on the above mentioned conventional protective sheet 120. In other words, means of storing the member to be stored in a compartment, such as the insertion direction and type of battery, may be indicated in a predetermined visible format on the display section (not shown) by printing or some other means.

Such a conventional protective sheet 120 is formed by such means as coating glue on the back face, and the protective sheet is secured at a predetermined position in the compartment by the adhesive strength of the glue.

For a conventional camera, various means to implement additional functions have been proposed and commercialized, such as a means for recording information related to the photographed frame, character information on the date at that moment, for example, at a predetermined position on the film at the same time when a desired object image is photographed and exposed on film. At the same time, an inexpensive camera, where such various additional functions are omitted, is also demanded.

So in order to manufacture a camera with various additional functions and a camera without these additional functions, efforts to decrease the manufacturing cost have been made by making the basic structure of cameras common so as to share a camera main body and basic elements, including a photographing lens.

In this case, for the camera main body to be the base, a form where various additional functions can be included is manufactured, and a plurality of types of cameras are manufactured, depending on whether components related to various functions are installed or not.

If a camera without various additional functions is manufactured in this way, unnecessary holes are formed at positions where components, according to predetermined additional functions, are supposed to be installed. If such unnecessary holes exist, beams of light or dust may enter inside the camera main body, which may cause various problems. If an unnecessary hole is at a position which the user can see from the outside, the external design is affected.

Considering this, in a conventional camera which is manufactured with common members, the above mentioned unnecessary holes, which exist in the case of a camera where additional functions are omitted, are covered with the above mentioned sheet material or some other means, so as to prevent beams of light or dust from entering inside the camera main body, considering external design.

Here, a conventional camera with a date information printing mechanism to implement a function to record date information at a predetermined position on the film face interlocking with the exposure operation executed when a photo is taken will be considered.

FIG. 14 is a perspective view depicting a conventional camera which has a date information printing mechanism as an additional function viewed from the back face side of the camera. In FIG. 14, the back face cover member 110 of the camera is fully opened.

In this state, the film cartridge compartment 121, to set a film cartridge (not shown), the film compartment 131 with a spool shaft 132 which is pivoted so as to freely rotate, and the aperture section for photography 115 to guide the luminous flux from the photographing lens (not shown) to the film surface, is opened toward the back face side.

A pressure plate 111 is disposed at a predetermined position roughly near the center of the back face cover member 110 which faces the aperture for photographing 115 when the back face cover member 110 is closed. A predetermined date information printing mechanism (details not shown) is disposed in a space between the pressure plate 111 and the back face cover member 110. A date information printing section 112 is formed at a predetermined position of the pressure plate 111. A contact for communication 113 is disposed at a predetermined position in the back face cover member 110, and the contact section 113a is exposed outside.

A movable contact unit (not shown) is disposed near the top portion of the spool compartment 131 in the camera 100. This movable contact unit includes the contact 114 for communicating with the date information printing mechanism, which will be described later. This contact 114 is formed so as to be moved freely by the function of a predetermined elastic force, and is disposed so as to protrude from the aperture 114a, which is formed at a predetermined position of the camera main body member 103, in a normal state. The contact 114 of this movable contact unit is located at a predetermined position facing the contact for communication 113a disposed in the camera main body when the back face cover member 110 is closed.

When the back face cover member 110 is closed, the contact for communication 113 of the date information printing mechanism and the contact 114 of the movable contact unit of the camera main body member 103 side are electrically connected. By this, the date information printing mechanism disposed at the back face cover member 110 side can be controlled by the control means (not shown) disposed at the camera main body member 103 side.

On the top face of the camera 100, a pop-up type strobe unit 140 is disposed at a predetermined position close to one end, and at a predetermined position close to the other end, control members such as a shutter release button 142, which interlocks with the switch to generate a predetermined signal to execute the start of an operation related to photo taking, and a zoom lever 143, which interlocks with the switch to generate an instruction signal to execute a magnification power change operation of the photographing lens, are disposed.

If another type of camera which does not have a date information printing mechanism is manufactured using the camera main body member 103 and external members (front side cover member 101, rear side cover member 102, back face cover member 110, etc.), which are the basic components of a conventional camera 100 with the date information printing mechanism configured as above, the aperture 114a of the camera main body member 103 side is exposed since the contact 114 of the movable contact unit is exposed. So in this case, means for blocking the aperture 114a by using a sheet member secured by glue has been used conventionally.

The adhesive strength of the glue used for a conventional protective sheet, however, is so strong that it is very difficult to peel off the protective sheet once glued. So when the protective sheet is attached during the manufacturing process of a camera, if the protective sheet is glued at a position which deviates from the predetermined position, a new protective sheet is required because it is impossible to peel off and glue the same protective sheet again.

This increases the man-hours required for attaching the protective sheet, and the protective sheet is wasted since it cannot be reused once it is peeled off, which aggravates manufacturing efficiency and increases manufacturing cost.

Also in the case of conventional means for securing the protective sheet by glue, the protective sheet is wasted and cannot be reused once it is peeled off for maintenance, inspection or repair of the camera, and a new protective sheet is required.

Also in the various compartments of a standard camera, various members are normally disposed as shown in FIG. 13. In the battery compartment 109, for example, such members as positive electrode and negative electrode battery contacts 106 are disposed. If the protective sheet is attached on the inner wall face of the compartment by glue, the protective sheet must absolutely be glued at a predetermined position of the inner wall face of the compartment while avoiding interference with various members in the compartment. Such an operation, however, is very difficult, so efficient manufacturing is impossible and manufacturing cost increases.

With the foregoing in view, the present invention was made.

SUMMARY OF THE INVENTION

It is a first object of the present invention to provide a camera which includes a compartment to load and store various members and a predetermined sheet member (e.g. protective sheet) attached along the inner wall surface of the compartment, wherein the sheet material is attached by an extremely easy and inexpensive means at a predetermined position while assuring good operability during the assembly operation and disassembly operation of the camera, so as to provide a camera which contributes to making the manufacturing process efficient and decreases the manufacturing cost.

It is a second object of the present invention to provide a camera which has an aperture section at a visible position, where a sheet member (e.g. protective sheet) is attached so as to block the aperture section, wherein the sheet member can be attached at a predetermined position by an extremely easy and inexpensive means while assuring good operability during the assembly operation and the disassembly operation of the camera, so that the basic members of the camera can be shared without affecting external design, and the efficiency of the manufacturing process and the decrease of manufacturing cost can be implemented.

In accordance with a first embodiment of the present invention, a camera includes a camera main body where an aperture section is formed at a visible position, and a sheet member for covering the aperture section so as to be easily attached/removed by elastic deformation without gluing.

In accordance with a second embodiment of the present invention, a camera includes a wall section whereby an inner face is formed to have a substantially curved surface, a sheet member which has elasticity and is attached so as to closely contact along the inner face of the wall section, and a holding section which is disposed on the inner face of the wall section and holds both ends of the sheet member against the resilience of the elastically deformed sheet member.

In accordance with a third embodiment of the present invention, a camera having a compartment for loading and storing members includes a wall section the inner face of which is formed to have a substantially curved surface to constitute the compartment, a sheet member which has elasticity and is attached so as to closely contact along the inner face of the wall section of the compartment, and a holding section which is disposed on the inner face of the wall section of the compartment, and holds the both ends of the sheet member against the resilience of the elastically deformed sheet member.

In accordance with a fourth embodiment of the present invention, a camera having a compartment for loading members includes a sheet member which has a resilience and constitutes a part (surface) exposed on the outside the inner wall face of the compartment by being attached on the inner wall face of the compartment, and a holding means which is disposed on the inner wall face of the compartment for holding both ends of the sheet member, wherein the sheet member is curled along the inner wall face, and the sheet member is attached and secured to the compartment by holding, and controlling the resilience generated by curling the sheet member using the above holding means.

In accordance with a fifth embodiment of the present invention, a camera having a compartment for loading members includes a camera main body where an aperture section or a convex/concave section is formed on the inner wall face of the compartment, a sheet member which has a resilience to return the curled state to the initial state and constitutes a part of the inner wall of the compartment by being attached to the inner wall face of the compartment so as to cover the aperture section or the convex/concave section, and two control holding members which are disposed on the inner wall face of the compartment respectively so as to correspond to both ends of the sheet member, and controls and holds the position of the sheet member by contacting both ends of the sheet member, wherein when the sheet member is curled and attached along the inner wall face, the sheet member is secured in the state of being curled in the compartment by controlling and holding the resilience generated by curling the sheet member, using the control holding member.

In accordance with a sixth embodiment of the present invention, a camera having a compartment for loading members includes a camera main body where an aperture section is formed on the inner wall face of the compartment, a sheet member which has a resilience to return the curled state to the initial state, and constitutes a part of the inner wall of the compartment by being attached to the inner wall face of the compartment so as to cover the aperture section, two control holding sections which are disposed on the inner wall face of the compartment respectively so as to correspond to the both ends of the sheet member and controls and holds the position of the sheet member by abutting on the both ends of the sheet member, and a receiving face section which is formed on the inner wall face of the compartment and between the two control holding sections for abutting on and receiving the face of the sheet member, wherein when the sheet member is curled and attached along the inner wall face, the sheet member is secured in the state of being curled in the compartment by controlling and holding the resilience generated by curling the sheet member using the control holding sections and the receiving face section.

The above and other objects and advantages of the invention will become more apparent in the following description.

According to the present invention, in a camera having a compartment for setting and storing various members with a predetermined sheet member (e.g. protective sheet) attached along the inner wall face of the compartment, the sheet member is attached at a predetermined position by a very easy and inexpensive means while assuring good operability during the assembly operation and the disassembly operation of the camera, therefore a camera which can contribute to making the manufacturing process efficient and to decreasing the manufacturing cost can be provided.

Also according to the present invention, in a camera where an aperture section is formed at a visible position and the aperture section is blocked using the sheet member (e.g. protective sheet), the sheet member is attached at a predetermined position by a very easy and inexpensive means while assuring good operability during the assembly operation and the disassembly operation of the camera, therefore sharing the basic members of a camera can be implemented without affecting external design, and a camera which can contribute to making the manufacturing process efficient and to decreasing the manufacturing cost can be provided.

DESCRIPTION OF THE PREFERRED EMBODIMENTS

Figure 1:
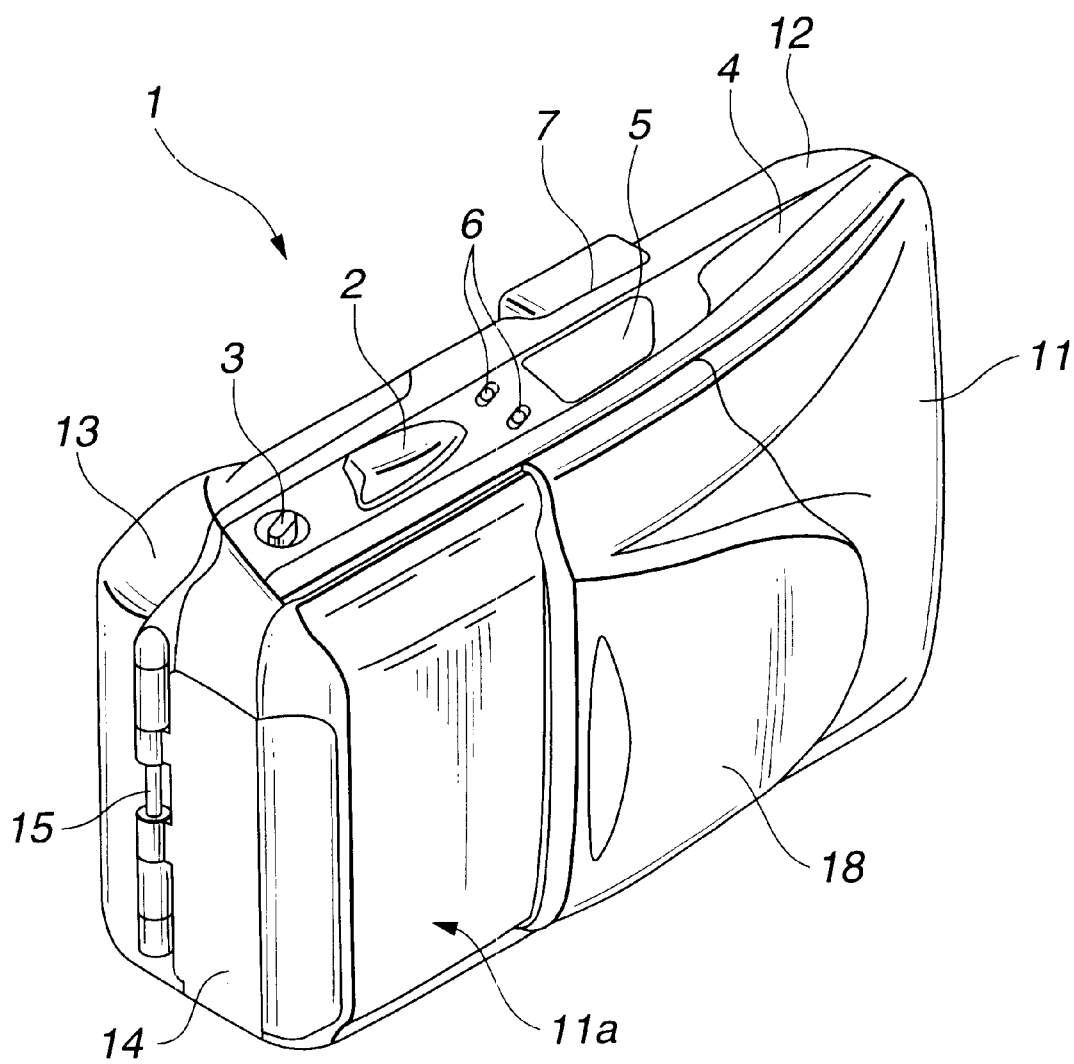
FIG. 1 is a perspective view depicting the appearance of a camera according to the first embodiment of the present invention.

FIG. 1 is a perspective view depicting the appearance of a camera according to the first embodiment of the present invention.

As FIG. 1 shows, the camera 1 of this embodiment is a compact type camera, which has a general shape structured such that photos can be taken using a rolled film. In the state shown in FIG. 1, the barrier member 18 which is disposed at the front face of the camera so as to slide on the surface perpendicular to the optical axis of the photographing lens, or taking lens (not shown) is at a completely closed position.

As FIG. 1 shows, in this camera 1, the front side cover member 11, the rear side cover member 12 and the back face cover member 13, which are external members, are disposed covering the camera main body member (not shown), so as to protect the camera main body member. On the surface of the external members, such components as various control members are disposed at respective predetermined positions, and these control members act on such members as electric circuits disposed in the camera main body.

In the front side cover member 11, an aperture section or convex/concave section (not shown) is disposed near the center at the front face side of the camera 1, and a lens barrel for holding the above mentioned photographing lens, an objective window of the finder, a light projecting window and a light receiving window of the focal point detector, and a remote control light receiving window are disposed at the camera main body side at the position corresponding to the aperture section or portion.

The aperture section is opened/closed by the barrier member 18 which is disposed so as to slide on the front face of the front side cover member 11. The barrier member 18 is disposed so as to slide on the plane perpendicular to the optical axis of the photographing lens (not shown), and FIG. 1 shows a status when the barrier member 18 is at a closed position. Therefore the front face of each member disposed at a position corresponding to the aperture section is covered by the barrier member 18, so these members are not shown in FIG. 1.

On the other end of the front cover member 11, a grip section 11a to be held by a user when the camera 1 is used is formed.

On the top face of the camera 1, the light emitting section 4 to be a part of the pop-up type strobe is disposed at a predetermined position closer to one end, and at a predetermined position closer to the other end, a shutter release button 2 interlocking with a switch to generate a predetermined signal to execute the start of an operation related to photo taking, such as an automatic focus adjustment operation (AF), an automatic exposure operation (AE) and shutter release, a zoom lever 3 interlocking with a switch to generate an instruction signal to execute a magnification power change operation of the photographing lens, and various other control members are disposed.

At the area near the center of the top face of the camera 1, a display member 5, such as an LCD to display the status of the camera 1, that is, the setting status, including photographing mode and strobe mode set in the camera 1, and various information including the date and time information, in such a predetermined visible format as characters and icons, is disposed, and in the area near this display member 5, control members 6 to set the photographing mode and strobe mode and to set the date and time information, are disposed at predetermined positions.

The rear side cover member 12 is sandwiched between the front side cover member 11 and the back face cover member 13, and the eye piece 7 of the finder is disposed at a predetermined position near the center of the rear side cover member 12 closer to the top.

The back face cover member 13 is pivoted by the spindle 15, which is fixed at the other end of the rear side cover member 12 so as to rotate, and the back face section of the camera 1 can be opened/closed by rotating the back face cover member 13. In this case, when the back face cover member 13 is opened, 19 the spool compartment (not shown) disposed at one end of the camera main body member and the film cartridge compartment 21 (not shown in FIG. 1, see FIG. 3) disposed at the other end of the camera main body member, are opened, so that the film cartridge (not shown) can be set and stored in the film cartridge compartment 21. When the back face cover member 13 is closed, on the other hand, a part of the inner face of the back face cover member 13 constitutes a part of the spool compartment and film cartridge compartment 21 respectively.

Also in this camera 1, a battery compartment 19 (not shown in FIG. 1, see FIG. 2 and FIG. 3) for removably setting and storing a power supply battery is formed inside the grip section 11a of the front cover member 11. And a battery compartment covert 14 for opening/closing the battery compartment 19 is disposed near the side face of the grip section 11a. This battery compartment cover 14 is pivoted by the spindle 15 so as to rotate. Here the above mentioned back face cover member 13 is also pivoted by the spindle 15, but the back face cover member 13 and the battery compartment cover 14 can be rotated independently from each other.

The rest of the major configuration of the camera 1 is the same as a standard camera.

Now a detailed configuration of the battery compartment for storing the power supply battery will be described among the compartments in the camera 1 for setting and storing predetermined members.

Figure 2:
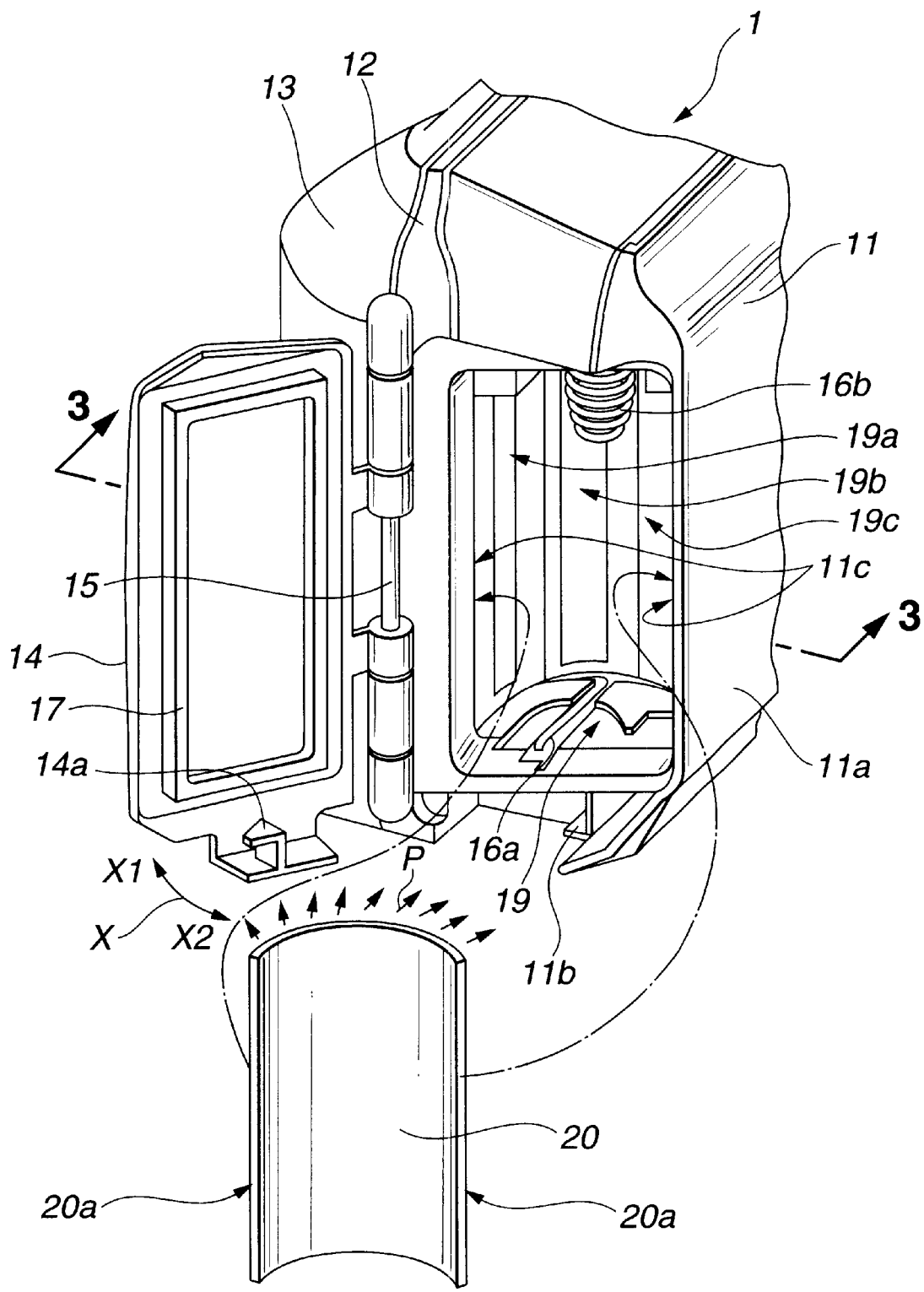
FIG. 2 is an enlarged perspective view depicting the section around the battery compartment of the camera in FIG. 1 when the battery compartment is open.
Figure 3:
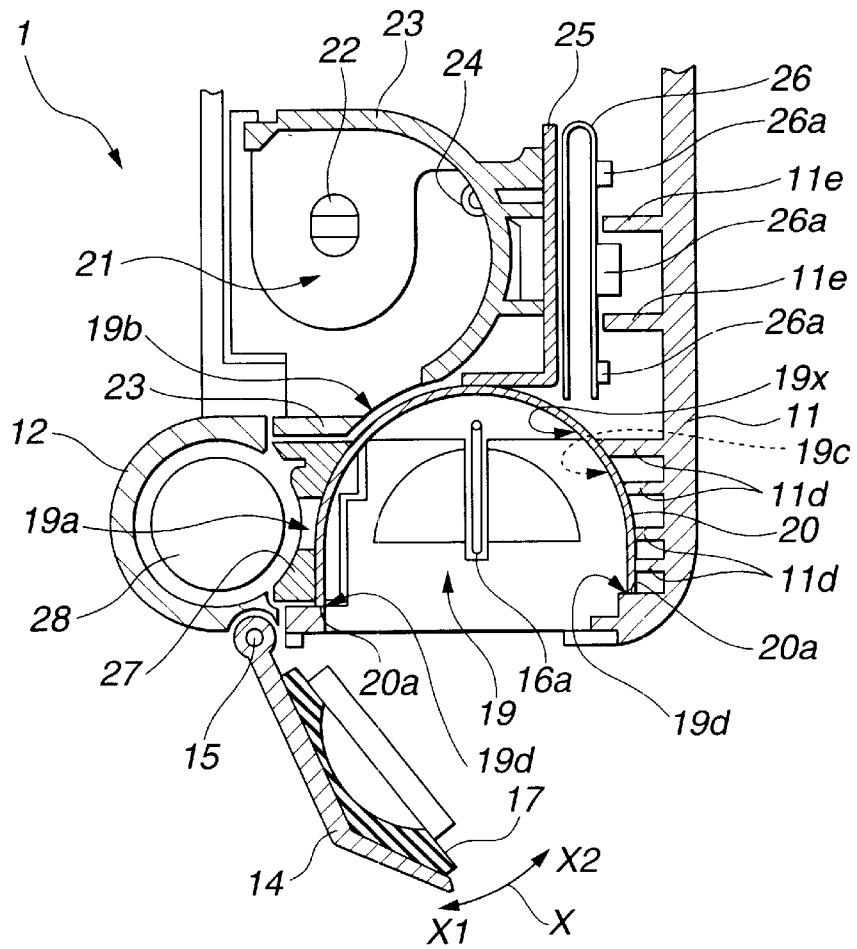
FIG. 3 is a cross-sectional view along the 3–3 line in FIG. 2 depicting the section around the battery compartment of the camera in FIG. 1.

FIG. 2 and FIG. 3 are drawings depicting the portion around the battery compartment of the camera of this embodiment, where FIG. 2 is an enlarged perspective view depicting this section when the battery compartment is in the open state, and FIG. 3 is a cross-sectional view along the 3–3 line in FIG. 2 depicting this section.

Figure 4:
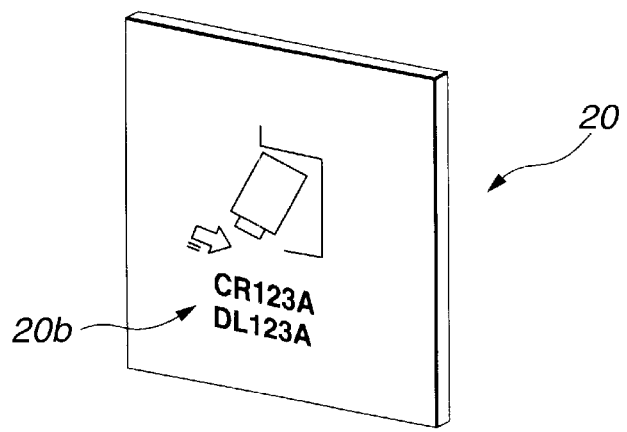
FIG. 4 is an enlarged perspective view depicting the sheet member (protective sheet) which is disposed along the inner wall face of the battery compartment of the camera in FIG. 1.
Figure 5:
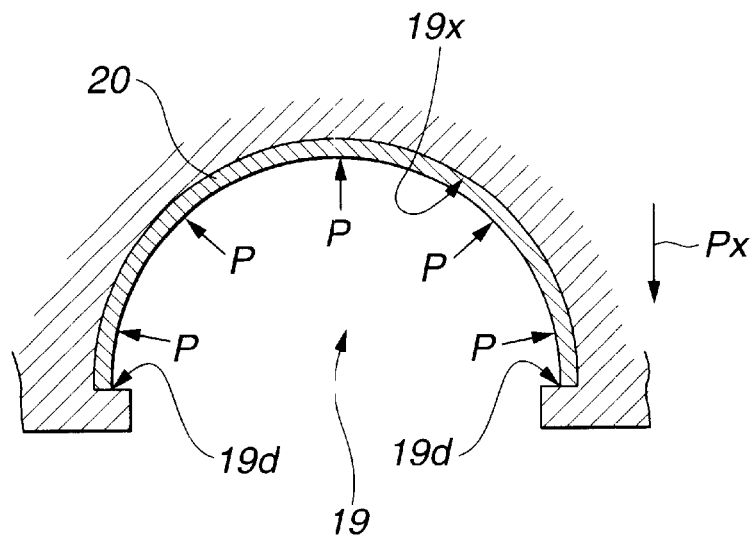
FIG. 5 is a conceptual cross-sectional view depicting the state when the sheet member is disposed on the various inner wall sections of the compartment in the camera in FIG. 1.

FIG. 4 is an enlarged perspective view depicting the sheet member (protective sheet) which is disposed along the inner wall face of the battery compartment of the camera of the present embodiment. And FIG. 5 is a conceptual cross-sectional view depicting the state when the sheet member is disposed on the various inner wall sections of the compartment in this camera.

The battery compartment 19 is disposed in the camera 1 of this embodiment near one end, as described above, and the battery compartment 19 can be freely opened/closed by the battery compartment cover 14.

The battery compartment cover 14 is disposed so as to rotate in the arrow X direction shown in FIG. 2 by the spindle 15 secured at one end of the rear side cover member 12, and which allows the battery compartment 19 to open by rotating the battery compartment cover 14 in the arrow X1 direction, and the battery compartment 19 to close by rotating the battery compartment cover 14 in the arrow X2 direction.

When the battery compartment cover 14 is in the open state (state shown in FIG. 2 and FIG. 3), a predetermined power supply battery (not shown) can be inserted into/removed from the battery compartment 19. The spindle 15 is means for pivoting not only the battery compartment cover 14, but also the above mentioned back face cover member 13 so as to rotate.

In the battery compartment cover 14, a latch member 14a, which is an engagement part for maintaining the closed state of the battery compartment cover 14, is integrated. At the side of the front side cover member 11, a latch section 11b, which is a part for maintaining the closed state of the battery compartment cover 14 by engaging with the above latch member 14a, is formed. This latch section 11b is formed at a position where the latch member 14a engages and links when the battery compartment cover 14 is rotated in the arrow X2 direction in FIG. 2, becoming a closed state (state in FIG. 1).

The engagement means comprising the latch member 14a of the battery compartment cover 14 and the latch section 11b of the front side cover member 11 is formed by members having elasticity respectively. Therefore, to release the engagement of the latches and to open the battery compartment cover 14 or to close the opened battery compartment cover 14 by engaging the latches, the battery compartment cover 14 can become the desired state (open state or closed state) by adding a predetermined force to the battery compartment cover 14 in a predetermined direction. The predetermined direction in this case is the arrow X1 direction in FIG. 2 to open the battery compartment cover 14, and is the arrow X2 direction in FIG. 2 to close the battery compartment cover 14.

The battery compartment cover 14 is formed such that the side facing the inner face of the battery compartment 19 when the battery compartment cover 14 is closed becomes a wall section having roughly a cylindrical shaped inner wall face. This wall section is formed to roughly match the external shape of a power supply battery (not shown) to be stored in the battery compartment 19. And when the battery compartment cover 14 closes, the wall section constitutes a part of the inner wall face (see 19x in FIG. 3 and FIG. 5) of the battery compartment 19.

Also in the battery compartment cover 14, a rubber packing 17 is disposed along the inner face of the wall section. This rubber packing 17 is for combining the battery compartment cover 14 and the side face of the front side cover member 11 where the edge of the battery compartment cover 14 contacts and becomes water tight when the battery compartment cover 14 is closed. As a result, the battery compartment 19 can maintain a water tight state from the outside.

In the battery compartment 19, a battery contact 16a at the positive electrode (plus: +) side is disposed on the floor part, and a battery contact 16b at the negative electrode (minus: −) is disposed on the ceiling part at predetermined positions respectively. These battery contacts 16a and 16b have a general configuration formed by a metal member in a predetermined shape, and are connection members to transfer power from the power supply battery set in the battery compartment 19 to various electric circuits (not shown) disposed in the camera 1.

The inner face of the wall section, which is the inner wall face of the battery compartment 19, is formed to be a curved surface, and is comprised of a part of the front cover member 11 and the rear side cover member 12. On this wall section, holes 19a, 19b and 19c are formed at predetermined positions. The inner wall face of the battery compartment 19 is along the virtual surface denoted by 19x in FIG. 3 and FIG. 5.

At the inner face side of the wall section of the battery compartment 19, a protective sheet 20, which is a sheet member, is attached, contacting along the inner face of the wall section. Therefore the wall section of the battery compartment 19 plays the role of the surface section to receive the protective sheet 20. FIG. 2 shows a state when the protective sheet 20 is not attached, and FIG. 3 shows a state when the protective sheet 20 is attached.

The protective sheet 20 is formed by a sheet-formed sheet member in the normal state shown in FIG. 4. The protective sheet 20 has a resilience, and is made of material such that if the protective sheet 20 is curled to be a curved surface opposing the resilience and then the force applied to the protective sheet 20 is released, for example, the protective sheet 20 returns to the original sheet form by its own elastic force. In other words, resin material or metal material, for example, is used as a material of the protective sheet 20.

On the protective sheet 20, a predetermined display section 20b is provided at a predetermined position. For example, FIG. 4 shows an example of the display section 20b when the protective sheet 20 is used for the battery compartment 19. The display section 20b in this case displays the type and the insertion direction of the power supply battery to be set and stored in the battery compartment 19, or the positional relationship of the electrodes and setting method are displayed in a visible format. As a specific indication means of the display section 20b, the display section 20b is formed on a surface at one side of the protective sheet 20 by such means as printing, for example.

In the camera 1 of this embodiment, a predetermined force is applied to areas near both ends 20a of the protective sheet 20 in this configuration in the directions to get both ends 20a closer to each other, so that the protective sheet 20 is disposed along the inner wall face of the battery compartment 19 to be the shape shown in FIG. 2, that is, in a curved shape. At this time, the force to restore the protective sheet 20 to be a flat shape acts on the protective sheet 20 by the function of the resilience P of the protective sheet 20. Since the resilience P, which is applied around the center of the protective sheet 20, is controlled by the wall section of the battery compartment 19, the resilience P acts on both ends 20a of the protective sheet 20 in the arrow Px direction shown in FIG. 5. Therefore, in this state, the protective sheet 20 is pushed outside the battery compartment 19.

So in order to maintain the protective sheet 20 in a state deformed to be a curved shape opposing the resilience of itself, and secure the protective sheet 20 at a position along the inner wall face (virtual face 19x in FIG. 3 and FIG. 5) of the battery compartment 19, the step 19d, which is a holding means or holding section or a control holding section, as shown in FIG. 3 and FIG. 5, is formed near the aperture section of the battery compartment 19, that is, inside both ends of the aperture, where the power supply battery is inserted/removed. Therefore, the protective sheet 20 contacts its both ends to the steps 19d while maintaining a curved shape, and is held by the steps 19d so that the resilience P of the protective sheet 20 can be controlled. In this way, the protective sheet 20 is secured at a predetermined position inside the battery compartment 19 without depending on such means as gluing.

When the protective sheet 20 is secured at a predetermined position inside the battery compartment 19 in this way, the holes 19a, 19b and 19c are covered with the protective sheet 20, and the inner wall face of the battery compartment 19 forms a curved shape as shown by the virtual face 19x. In this state, the protective sheet 20 assumes the appearance of the inner wall face of the battery compartment 19.

On the inner face of the front side cover member 11 facing the hole 19c, predetermined shaped ribs 11d to be the receiving section, as shown in FIG. 3, are formed, whereby the outer face of the protective sheet 20 is supported and the curved surface shape thereof is maintained.

Near the battery compartment 19, a capacitor 28 is disposed at a position closer to the back face of this camera 1. A battery compartment frame 27 is provided between the capacitor 28 and the battery compartment 19. Therefore the battery compartment frame 27 constitutes a part or surface of the inner wall face of the battery compartment 19. In other words, the capacitor 28 is disposed in a predetermined space formed by a part of the rear side cover member 12 and the battery compartment frame 27.

As FIG. 3 shows, a film cartridge compartment 21 is formed at a predetermined position adjacent to the battery compartment 19. This film cartridge compartment 21 is formed by the wall section 23 constituting the camera main body member disposed in the camera 1, so that the film cartridge (not shown) is set and stored inside in a predetermined state. The film cartridge compartment 21 and the battery compartment 19 are linked by the hole section 19b.

In the film cartridge compartment 21, a DX contact 24 for reading DX code, which is information on the rolled film stored inside the film cartridge, such as film sensitivity and film length (number of frames which can be shot), is disposed at a predetermined position on the inner face of the wall section and on the peripheral surface of the film cartridge. on the floor face in the film cartridge compartment 21, a shaft member 22, which engages the spool shaft in the film cartridge set in the film cartridge compartment 21 and which rotates the spool spindle in a predetermined direction using a predetermined power mechanism, is rotatably disposed.

On the outer wall face of the film cartridge compartment 21, a flexible printed board (hereafter FPC) 26, which is a part of an electronic member of the camera 1, is secured by a predetermined means. In other words, on the outer face of the film cartridge compartment 21, a board base 25 where the cross-section is L-shaped as shown in FIG. 3, is integrated, and the FPC 26 is secured to this board base 25 by a predetermined fastening means (e.g. screws). The FPC 26 is disposed in a bent state in the camera 1. And on the surface of the FPC 26, various electronic members 26a, such as an IC, are mounted. on the inner face of the front cover member 11 facing the surface where the mounting members 26a are mounted (mounting surface), a plurality of ribs 11e are formed at a predetermined position. These ribs 11e maintain the position of the FPC 26 and also play a role of protecting the surface of the mounting members 26a.

In the camera 1 of this embodiment configured as described above, the action of attaching the protective sheet 20 to the battery compartment 19 will now be described.

At first the battery compartment cover 14 of the camera 1 is opened by rotating it in the arrow X1 direction from the closed position, so as to open the aperture of the battery compartment 19.

In this state, force is applied to both ends 20a of the protective sheet 20 so as to deform the protective sheet 20 into a curved shape, and while maintaining the curved shape, the protective sheet 20 is inserted inside the battery compartment 19. At this time, the top edge of the protective sheet 20 must be prevented from interfering with the members disposed inside the battery compartment 19, such as battery contacts 16a and 16b. In this way, the protective sheet 20 is attached along the inner face of the wall section of the battery compartment 19. After inserting the protective sheet 20 into the position where both ends 20a thereof contact the steps 19d, the force being applied to the protective sheet 20 is released. Then both ends 20a of the protective sheet 20 contact the steps 19d by the resilience P thereof, and the resilience P is controlled by the steps 19d. By this, the protective sheet 20 is secured at a predetermined position inside the battery compartment 19 to be a predetermined shape without using such means as gluing.

The protective sheet 20 is removed from inside the battery compartment 19 according to the following procedure. In the same way as attaching the protective sheet 20, force opposing the resilience P is applied to at least one of the two ends 20a of the protective sheet 20 when the battery compartment cover 14 is opened and the aperture of the battery compartment 19 is opened, so as to release the contacting state between both ends 20a of the protective sheet 20 and the steps 19d. And the protective sheet 20 is drawn out from the aperture such that the protective sheet 20 does not interfere with the internal members of the battery compartment 19. Then the protective sheet 20 can be easily taken out from the battery compartment 19, and can be attached again inside the battery compartment 19 for reuse.

As described above, according to the first embodiment, the steps 19d to be holding sections are formed near the aperture section of the battery compartment 19, that is, inside both ends of the aperture where the power supply battery is inserted or removed, so that when the sheet member having resilience, that is, the protective sheet 20, is attached contacting along the inner face of the wall section comprised of a curved surface of the battery compartment 19, both ends 20a of the protective sheet 20 are contacted and held by the steps 19d by the resilience of the protective sheet itself, and as a result, the protective sheet 20 is secured at a predetermined position inside the battery compartment 19. Therefore the protective sheet 20 can be secured without fail by an extremely simple configuration.

Also, the protective sheet 20 which is secured without using such means as gluing can be easily removed and easily reattached. Therefore operability during manufacturing and assembly can be improved, and the removed protective sheet 20 can be used again during repair, maintenance and inspection, so member waste can be prevented and operability can be more efficient.

In the first embodiment, to secure the protective sheet 20 at a predetermined position inside the battery compartment 19, steps 19d for holding both ends 20a of the protective sheet 20 and controlling the resilience thereof are disposed. The shape of steps 19d, for example, are flat faces roughly perpendicular to both ends 20a of the protective sheet 20, in order to contact the steps 19d, as shown in FIG. 3 and FIG. 5. The shape of steps 19d, however, is not limited to this but may have the following shapes.

In other words, a protrusion which extends into the inside of the battery compartment 19 is disposed at one end of steps 19d. Then when both ends 20a of the protect sheet 20 contact the contacting faces of steps 19d, both ends 20a of the protect sheet 20 are caught between the protrusion and the inner wall face of the battery compartment 19, and the protective sheet 20 is more firmly secured at a predetermined position inside the battery compartment 19.

As another means, the virtual face 19x of the inner wall face of the battery compartment 19 near the step 19d and the abutting face of the step 19d, on which the end 20a of the protective sheet 20 abuts, may form an acute angle. In this case as well, when both ends 20a of the protective sheet 20 abut the abutting faces of steps 19d, both ends 20a of the protective sheet 20 are guided to the corners closer to the inner wall face of the battery compartment 19 while the resilience of the protective sheet 20 is controlled, and the protective sheet 20 is more firmly secured.

In the above first embodiment, the battery compartment 19 is used as a compartment where an member is stored, and the case when the protective sheet 20 is secured on the wall section inside the battery compartment 19 is shown as an example, but the compartment is not limited to this, but the present invention can also be applied to the case when the same protective sheet is disposed on the inner face of a film cartridge compartment or spool compartment, for example.

The second embodiment of the present invention will now be described.

Figure 6:
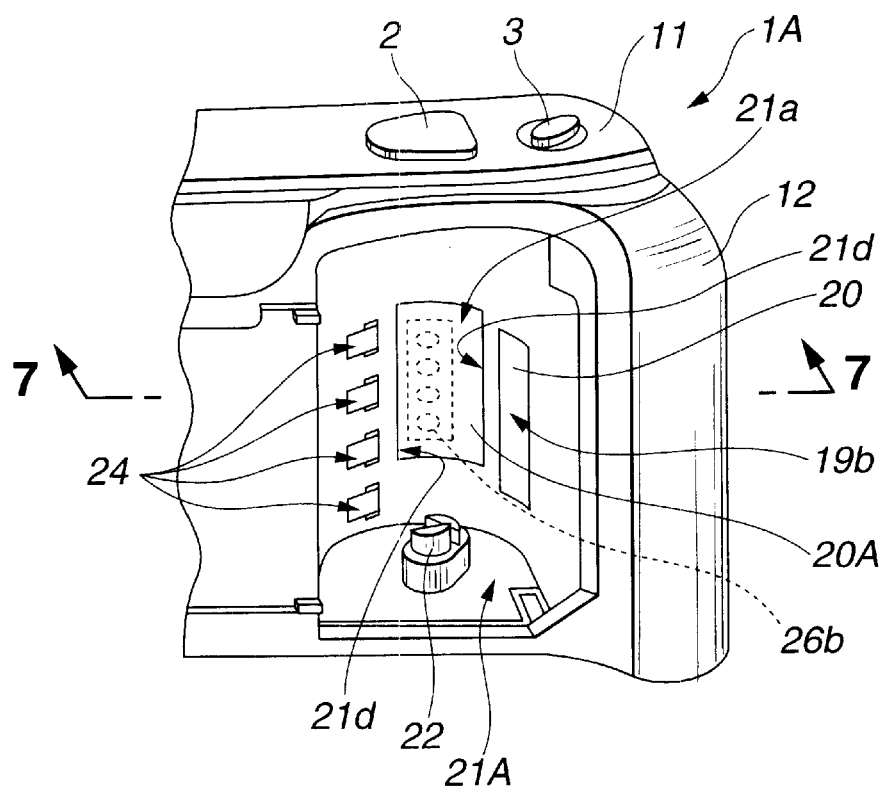
FIG. 6 is an enlarged perspective view depicting the section near the film cartridge compartment and inside the film cartridge compartment in the camera according to the second embodiment of the present invention.
Figure 7:
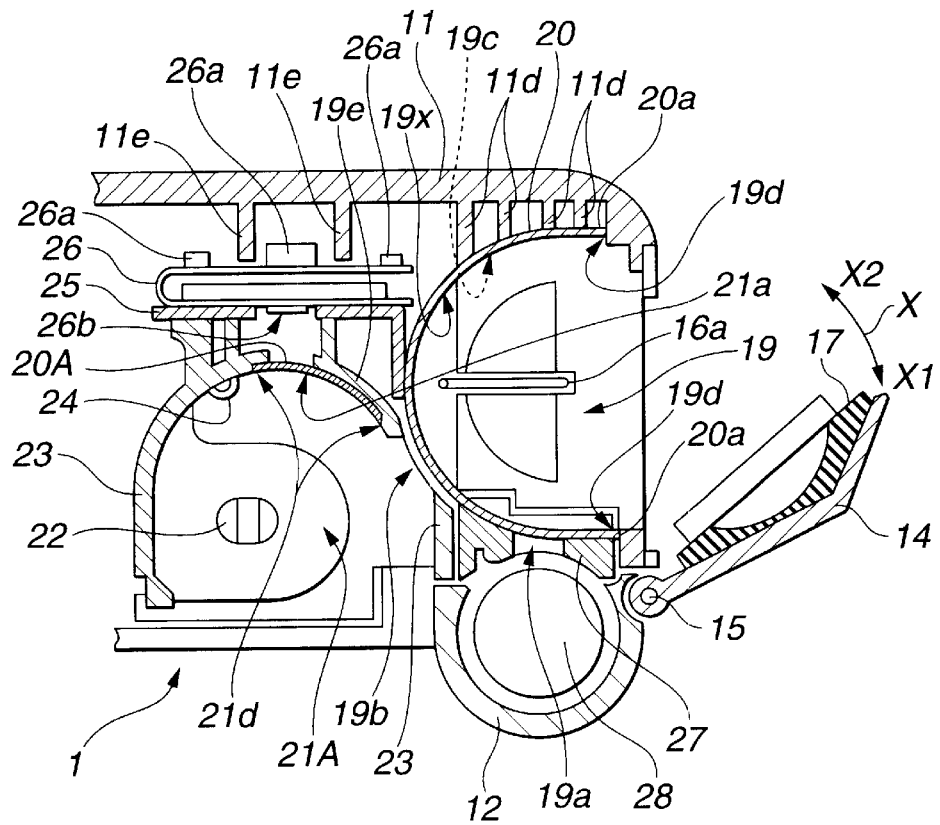
FIG. 7 is a cross-sectional view along the 7–7 line in FIG. 6.

FIG. 6 and FIG. 7 show drawings near and inside the film cartridge compartment in a camera according to the second embodiment, where FIG. 6 is an enlarged perspective view of the key section, and FIG. 7 is a cross-sectional view along the 7–7 line in FIG. 6. In FIG. 6 and FIG. 7, the back face cover member is not shown, to simplify the drawings. FIG. 7 corresponds to FIG. 3 in the above mentioned first embodiment.

The basic configuration of the camera of this embodiment is generally the same as the configuration of the camera of the first embodiment. In this embodiment, disposing the protective sheet on the aperture section, which is disposed at a predetermined position inside the film cartridge compartment, will be described. Therefore the components the same as the first embodiment are denoted with the same reference numerals, for which description is omitted.

As FIG. 6 shows, the film cartridge compartment 21A in the camera 1A of this embodiment is disposed near one end of the camera main body member, just like the film cartridge compartment 21 in the camera 1 of the first embodiment, and is formed such that a part of the cylindrical shape is opened. Inside the film cartridge compartment 21A, a film cartridge (not shown) can be set and stored. When the back face cover member (not shown) is closed, a part inside the back face cover member constitutes a part of the inner wall face of the film cartridge compartment 21A.

Roughly at the center of the floor face of the film cartridge compartment 21A, a shaft member 22, which engages the spool shaft of the film cartridge to be set inside the film cartridge compartment 21A, is rotatably pivoted. This shaft member 22 can rotate using a predetermined power mechanism (not shown). By this, the exposed film stored at the spool compartment (not shown) side, disposed at the other end of the camera main body member, can be rewound back into the film cartridge.

On the inner wall face of the camera main body member side of the film cartridge compartment 21A, DX contacts 24 are disposed at predetermined positions, and a hole section 19b to be an aperture section and an aperture 21a for adjustment are formed. The hole section 19b corresponds to the location linking the film cartridge compartment 21A and the battery compartment 19 (see FIG. 7), and is covered by the protective sheet 20 (see FIG. 7) disposed on the wall face of the battery compartment 19.

The aperture 21a for adjustment is disposed so as to face a predetermined conducting pattern formed on the flexible printed board (FPC) 26, which is disposed on the wall face inside the camera main body member of the film cartridge compartment 21A, shown in FIG. 7, that is, to face the check land pattern 26b.

The check land pattern 26b is formed by a plurality of contacts which are disposed for inspecting and adjusting the electric circuits of the camera 1A, so that predetermined electric signals for inspection and adjustment can be input to/output from the electric circuits of the camera 1A by contacting a predetermined jig for inspection and adjustment (not shown) to the check land pattern 26b.

In order to contact the jig for inspection and adjustment to the check land pattern 26b, the aperture for adjustment 21a is disposed on the wall face of the film cartridge compartment 21A in the camera 1A of this embodiment. In other words, the check land pattern 26b is not used during normal photo taking of this camera 1A, but is required only for inspection and adjustment. Therefore, normally the aperture for adjustment 21a is blocked by the protective sheet 20A.

In this case, steps 21d, which are a holding means of the protective sheet 20A, are formed on both ends inside the edge section of the aperture for adjustment 21a, as shown in FIG. 6 and FIG. 7. These steps 21d are formed by steps which concave into the surface at the edge section of the aperture for adjustment 21a.

Both ends of the protective sheet 20A abut the steps 21d while maintaining the curved shape of the protective sheet 20A so as to control the resilience thereof, and as a result, the protective sheet 20A is held. In this way, the protective sheet 20A is secured at a predetermined position inside the film cartridge compartment 21A while blocking the aperture for adjustment 21a without using such means as gluing.

In the state where the protective sheet 20A blocks the aperture for adjustment 21a, the protective sheet 20A is set so as to cover an area which is sufficiently wider then the aperture for adjustment 21a. In other words, both ends of the protective sheet 20A are held by the steps 21d, and the protective sheet 20A is disposed along a part of the inner wall face of the film cartridge compartment 21A in a location 19e other than the location corresponding to the aperture for adjustment 21a (see FIG. 7). Therefore, in this case, the part of the inner wall face of the film cartridge compartment 21A plays a role of a receiving section which supports the protective sheet 20A, maintaining the curved shape.

In the camera 1A of this embodiment configured like this, an action to attach the protective sheet 20A to the aperture for adjustment 21a disposed inside the film cartridge compartment 21A and an action to remove the protective sheet 20A are roughly the same as the case of the protective sheet 20 of the above mentioned first embodiment.

In other words, in order to attach the protective sheet 20A to the aperture for adjustment 21a, force is applied to both ends of the protective sheet 20A first to form it to the curved shape, then while maintaining the curved state, the protective sheet 20A is inserted until the position where both ends thereof can abut the steps 21d of the aperture for adjustment 21a, and the force being applied to the protective sheet 20A is released. Then both ends of the protect sheet 20A abut the steps 21d by its own resilience, and the resilience is controlled. By this, the protective sheet 20A is secured at a predetermined position inside the aperture for adjustment 21a to be a predetermined shape without using such means as gluing.

In order to remove the protective sheet 20 from the aperture for adjustment 21a, on the other hand, a location corresponding to the aperture for adjustment 21a of the sheet member 21A is pressed with a thin stick member, such as a ballpoint pen. Then both ends of the protective sheet 20A displace in a direction away from the steps 21d, and the elastic force of the protective sheet 20A, controlled by the steps 21d, is released. By this, the protective sheet 20A is detached from the aperture for adjustment 21a by the action of its own elastic force. In this way, the protective sheet 20A can be easily removed from the aperture for adjustment 21a, and can be attached to the same position again for reuse.

As described above, according to the second embodiment of the present invention, the protective sheet 20A can be secured to the aperture for adjustment 21a without fail by a very simple configuration just like the above mentioned first embodiment. At the same time, the protective sheet 20A, which is secured without using such means as gluing, can be easily attached and removed (attached/removed) for reuse.

The third embodiment of the present invention will now be described.

Figure 8:
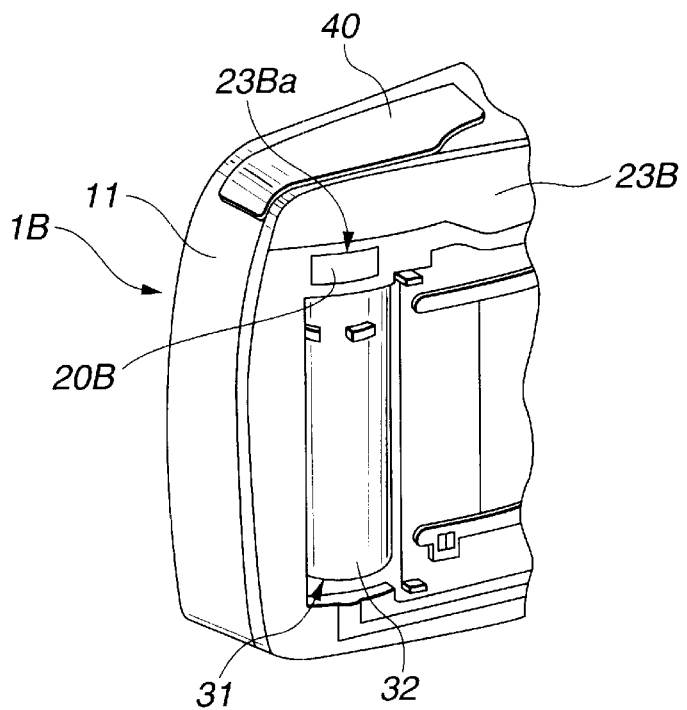
FIG. 8 is an enlarged perspective view depicting the section inside and around the spool compartment in the camera according to the third embodiment of the present invention.
Figure 9:
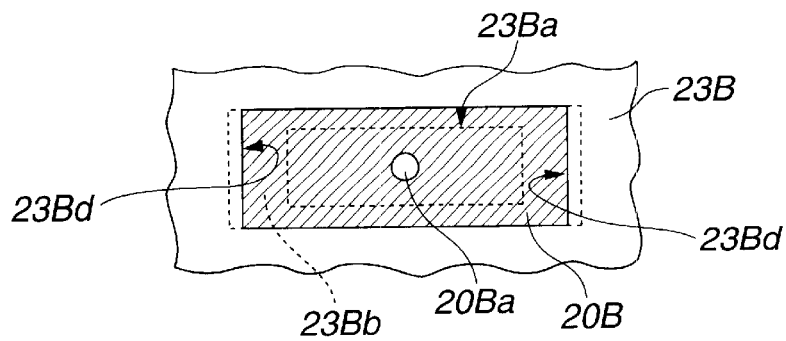
FIG. 9 is an enlarged front view depicting the aperture which is formed at a predetermined position of the camera main body member of the camera in FIG. 8 and the protective sheet which is attached to the aperture.
Figure 10:
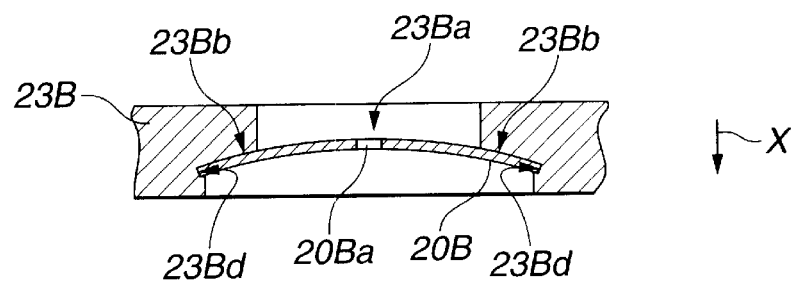
FIG. 10 is an enlarged cross-sectional view of the aperture and protective sheet in FIG. 9.

FIG. 8 is an enlarged perspective view depicting a part of the camera of the third embodiment, that is, the key section inside and near the spool compartment. In FIG. 8, the back face cover member is not shown to simplify the drawing. FIG. 9 and FIG. 10 are drawings depicting only the aperture to be formed at a predetermined position of the camera main body member of this camera and the protective sheet to be attached to the aperture, where FIG. 9 is an enlarged front view depicting the aperture and the protective sheet, and FIG. 10 is an enlarged cross-sectional view of the aperture and the protective sheet.

The basic configuration of the camera of this embodiment is generally the same as the configuration of the camera of the first embodiment, and this embodiment shows the case when the holes formed at a predetermined position of the camera are blocked by the protective sheet. Therefore, the components the same as the first embodiment are denoted with the same reference numerals, for which description is omitted.

The camera 1B of this embodiment is comprised of a camera main body member and external members (e.g. front side cover member, rear side cover member, back face cover member), common to a camera having a date information printing mechanism as an additional function (see FIG. 14), for example, where a predetermined additional function (e.g. date information printing mechanism) is omitted.

Figure 14:
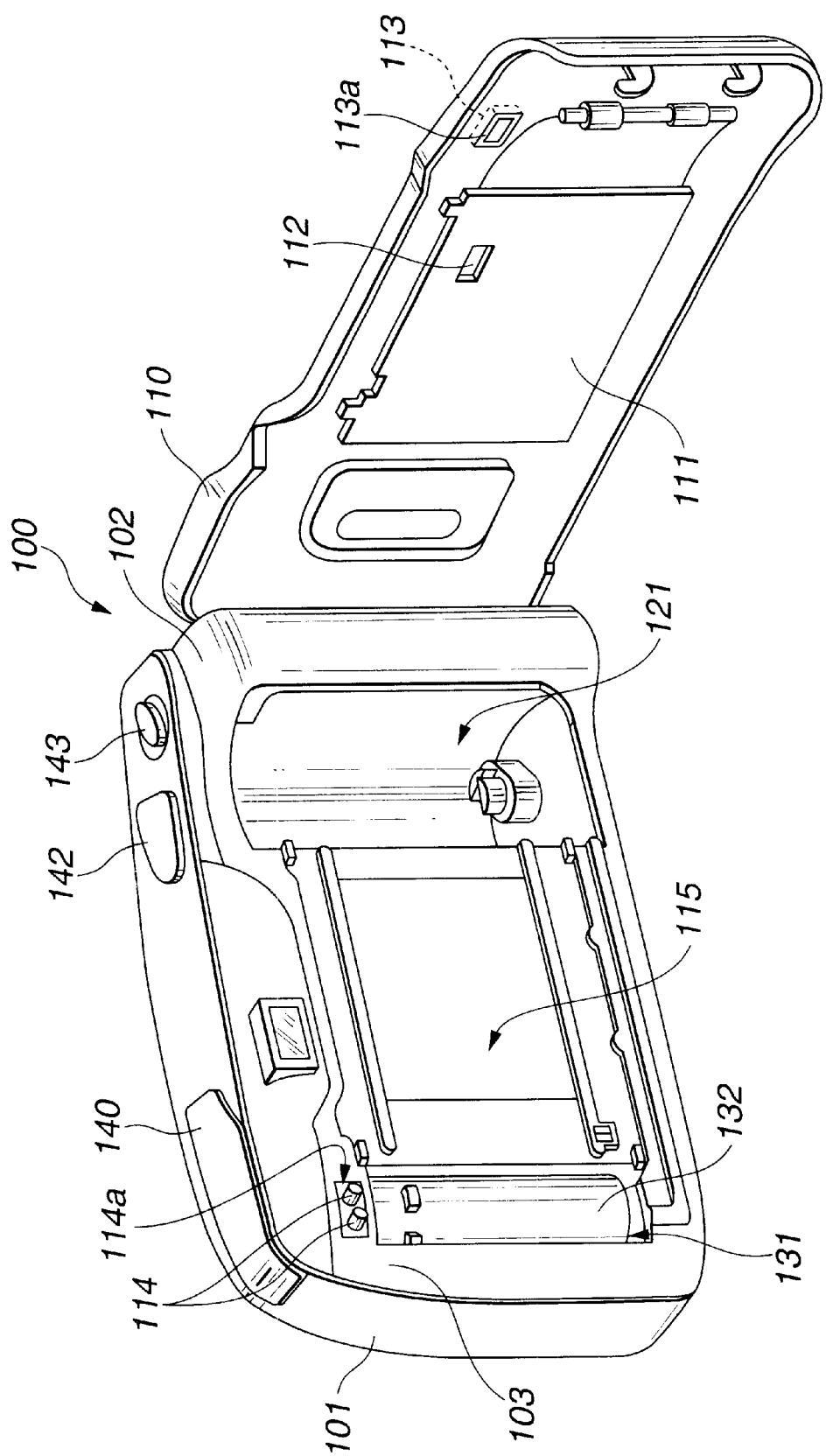
FIG. 14 is a perspective view depicting a conventional camera which has a date information printing mechanism as an additional function, viewed from the back face side of the camera.

As FIG. 8 shows, an aperture 23Ba, which is a predetermined aperture section, is formed near the top of the spool compartment 31, which is at a predetermined position of the camera main body member 23B of this camera 1B and where the spool shaft 32 is rotatably disposed. This aperture 23Ba is an aperture section formed at a position where the contact section 114 of the movable contact unit, as shown in FIG. 14, is supposed to be disposed if a date information printing mechanism were equipped to the camera 1B as an additional function. At the furthest top of the spool shaft 31, a so called pop-up type strobe 40 is disposed.

In the camera 1B of this embodiment, the aperture 23Ba is blocked by the protective sheet 20B, since it is unnecessary. Therefore, the cross-section of the camera main body member 23B near the aperture 23Ba is as shown in FIG. 10.

In other words, on the edge area of the aperture 23Ba, a receiving face section 23Bb, whereby a cross-section is formed to be a part of a curve (arc shape), is formed, where the surface of the protective sheet 20B, which is disposed in a curved shape, is contacted and received. At a predetermined position at the edge area of the receiving face section 23Bb, where both ends of the protective sheet 20B in the longitudinal direction are disposed, the steps 23Bd to be the control holding sections are formed.

On the protective sheet 20B of this embodiment, on the other hand, a round hole 20Ba for a removing operation is opened at a predetermined position roughly at the center, as shown in FIG. 9. This hole 20Ba is set to be a predetermined size so that a pointed stick member of a jig, such as a tweezers, can be inserted to remove the protective sheet 20B which is attached for blocking the aperture 23Ba.

In this embodiment configured as mentioned above, to attach the protective sheet 20B to the aperture 23Ba, a predetermined force is applied to both ends of the protective sheet 20B in a longitudinal direction, just like the first embodiment, so as to deform the protective sheet 20B to a curved shape, and is disposed along the receiving face section 23Bb of the aperture 23Ba while maintaining the above state.

When the force maintaining the curved shape of the protective sheet 20B is released, the resilience thereof acts on the protective sheet 20B, and a force is generated in a direction from the curved state to a flat state. The position and force at both ends of the protective sheet 20B in a longitudinal direction are controlled by the steps 23Bd. By this, the aperture 23Ba is blocked and covered.

To remove the protective sheet 20B, a pointed stick member of a jig, such as a tweezers, is inserted into the hole 20Ba for the operation to be attached/removed, and the protective sheet 20B is pulled out in the arrow X direction, shown in FIG. 10. Then the protective sheet 20B is deformed to be a curved shape, extending in the X direction, opposing its own elastic force, and is pulled out while both end faces thereof are sliding on the surfaces of the steps 23Bd. In this way, the protective sheet 20B is removed.

As described above, according to the third embodiment, the protective sheet can be easily attached/removed to block the aperture, which is formed on a roughly flat location of the external member of the camera 1B by a very simple configuration, and the protective sheet can be easily attached/removed, so the camera 1B can contribute to making operation during the manufacturing process efficient and decreasing the manufacturing cost.

The fourth embodiment of the present invention will now be described.

Figure 11:
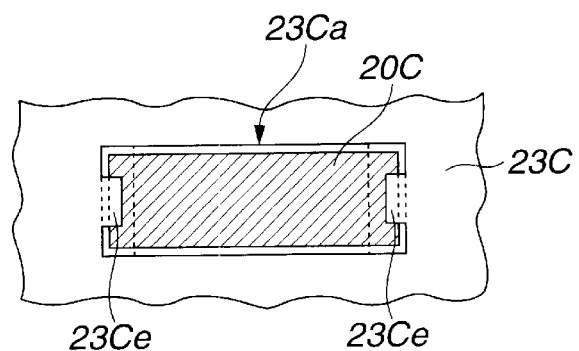
FIG. 11 is an enlarged front view depicting the aperture which is formed at a predetermined position of the camera main body member of the camera according to the fourth embodiment of the present invention and the protective sheet which is attached to the aperture.
Figure 12:
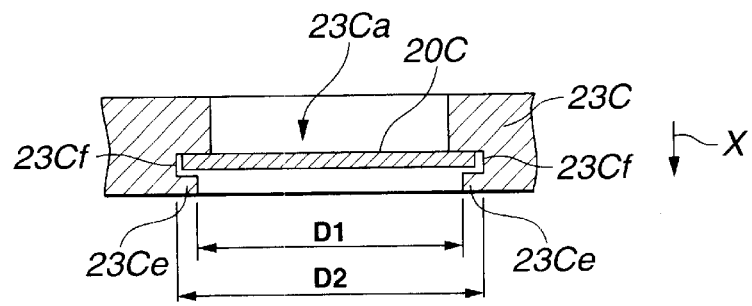
FIG. 12 is an enlarged cross-sectional view of the aperture and protective sheet in FIG. 11.
Figure 13:
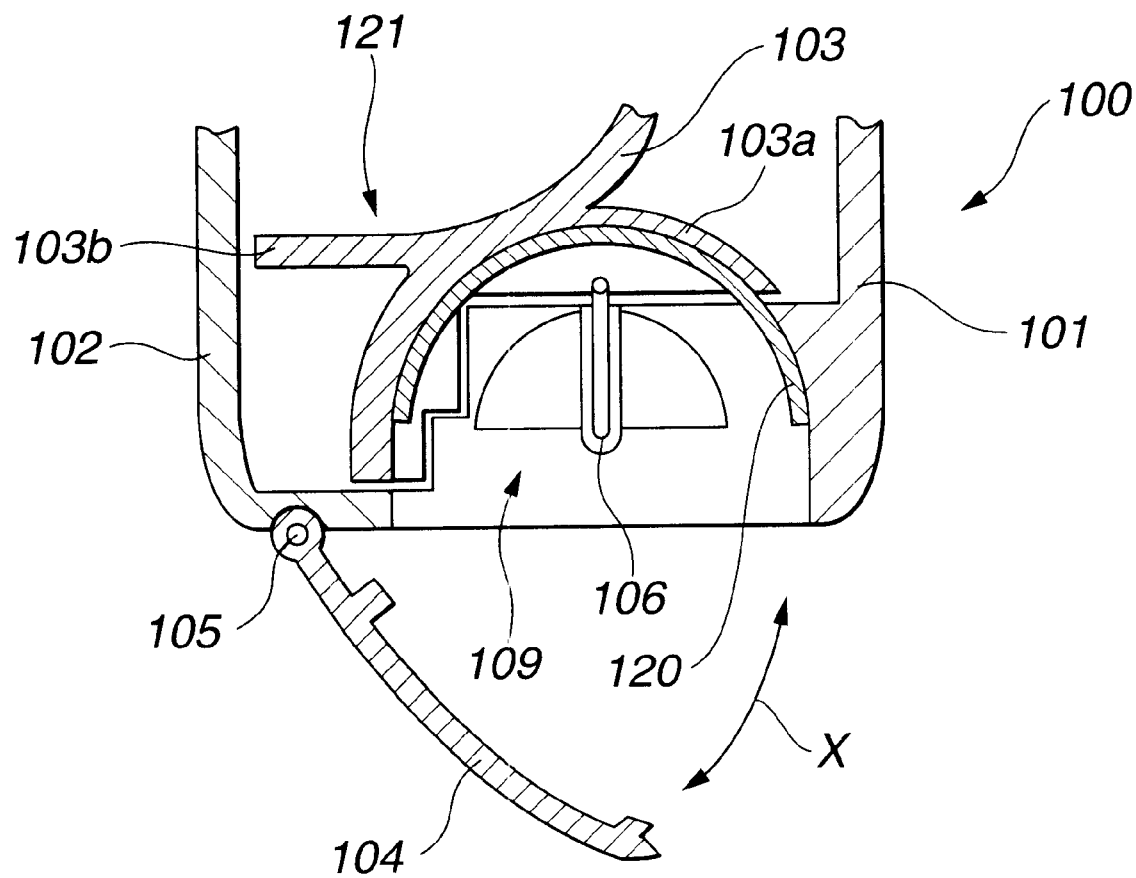
FIG. 13 is an enlarged cross-sectional view depicting the section around the battery compartment in a conventional camera.

FIG. 11 and FIG. 12 are drawings depicting a part of the camera of the fourth embodiment of the present invention, that is, an aperture formed at a predetermined position of the camera main body member of this camera, and the protective sheet attached to the aperture, wherein FIG. 11 is an enlarged front view depicting the aperture and the protective sheet, and FIG. 12 is an enlarged cross-sectional view depicting the aperture and the protective sheet.

This embodiment is a variant form of the above mentioned third embodiment, where the holding means of the protective sheet is different in configuration. Since the basic configuration of the camera is generally the same as the above mentioned first to third embodiments, the components the same as these embodiments are denoted with the same reference numerals for which description is omitted, and only different parts will be described below.

In this embodiment, holding sections 23Cf, having a concave shaped cross-section, are formed at both ends of the aperture 23Ca, which is an aperture section, in the longitudinal direction respectively, as shown in FIG. 12. The protective sheet 20C is disposed inside the holding sections 23Cf. The protective sheet 20C, disposed inside the holding section 23Cf, is engaged with the latches 23Ce of the holding sections 23Cf, at locations closer to the outside, so as not to fall off. In this case, the interval dimension D1 between the tips of the latches 23Ce (see FIG. 12) is set to be shorter than the dimension of the protective sheet 20C in the longitudinal direction. The interval dimension D2 (see FIG. 12) of the holding section 23Cf is set to be longer than the dimension of the protective sheet 20C in the longitudinal direction.

In order to attach the protective sheet 20C to block the aperture 23Ca in this embodiment configured in this way, one of the ends of the protective sheet 20C in the longitudinal direction is set inside one of the holding sections 23Cf. In this state, force is applied to the other end of the protective sheet 20C in the longitudinal direction, in the direction along the longitudinal side of the protective sheet 20C, so as to slightly bend. While maintaining this state, the other end of the protective sheet 20C in the longitudinal direction is set inside the other holding section 23Cf, and the force applied to the protective sheet 20C is released. Then the resilience acts on the protective sheet 20C in the direction making it become flat by the elastic force of the protective sheet 20C. Since the interval dimension D2 between the holding section 23Cf is set to be longer than the dimension of the protective sheet 20C in the longitudinal direction, no force is now applied and no control is exerted to the protective sheet 20C. And the protective sheet 20C is engaged by the latches 23Ce so as not to fall off.

To remove the protective sheet 20C from the position blocking the aperture 23Ca, on the other hand, a pointed stick member of a jig, such as a tweezers, is inserted into a gap between the protective sheet 20C and the aperture 23Ca, and force is applied in the arrow X direction, shown in FIG. 12, so as to pull out the protective sheet 20C. Then the protective sheet 20C is deformed to be a curved shape, extending in the X direction opposing its own elastic force, and is pulled out while both ends slide over the latches 23Ce. In this way, the protective sheet 20C can be removed.

Unlike the protective sheet 20B of the third embodiment, the protective sheet 20C does not have the hole (20Ba) for operation to be attached/removed, as shown in FIG. 11, however this hole may be opened. If the hole for operation to be attached/removed is opened, the protective sheet 20C is removed in the same way as the above mentioned third embodiment.

As described above, according to the fourth embodiment of the present invention, the effects the same as the above mentioned third embodiment can be implemented.

In the present invention, it is apparent that different embodiments in a wide range can be configured based on the present invention within the scope and spirit of the invention. The present invention is restricted only by the appended claims, but is not restricted by the specific embodiments thereof.

What is claimed is:

1. A camera comprising:
    a camera main body having an opening;
    holding members provided at end portions of said opening; and
    an elastically deformable sheet member for covering an inner wall surface of said camera main body;
    wherein said sheet member comprises a display surface and is attachable to said inner wall surface of said camera main body by elastic deformation to abut and press against said holding members, without gluing.

2. The camera according to claim 1, further comprising:
    a cover member which can be opened and closed between a position at which said inner wall surface is visible and a position at which said inner wall surface is not visible.

3. The camera according to claim 1, further comprising:
    a wall section which is formed around said opening and which defines said inner wall surface of the camera main body; and
    wherein said holding members are disposed near said wall section on an extended line in a direction in which said sheet member is elastically deformed when said sheet member is attached/removed from said inner wall surface of the camera main body.

4. The camera according to claim 3, wherein said inner wall surface of said camera main body has a substantially curved shape, so that said sheet member abuts on said inner wall face to have a corresponding substantially curved shape while maintaining an elastically deformed state.

5. The camera according to claim 4, wherein said wall section comprises concavely arranged steps, and said holding members comprise side faces of two of said steps.

6. A camera comprising:
    a wall section, an inner face of which has a substantially curved shape;
    an elastically deformable sheet member which comprises a display surface and which is attachable so as to closely contact along the inner face of said wall section; and
    holding members disposed on the inner face of said wall section for holding both ends of said sheet member opposing a resilience of said elastically deformable sheet member, in a manner such that the ends of said sheet member abut and press against said holding members.

7. The camera according to claim 6, wherein said wall section defines a compartment.

8. The camera according to claim 6, wherein the display surface of said sheet member displays predetermined information in a visible format.

9. A camera having a compartment into which an element may be loaded and stored, said camera comprising:
    a wall section, an inner face of which is formed to have a substantially curved shape to define said compartment;
    an elastically deformable sheet member which comprises a display surface and which is attachable so as to closely contact along the inner face of said wall section; and
    holding members disposed on the inner face of said wall section for holding both ends of said sheet member opposing a resilience of said elastically deformable sheet member, in a manner such that the ends of said sheet member abut and press against said holding members.

10. The camera according to claim 9, wherein the element to be loaded and stored in said compartment is a power supply battery or a film cartridge.

11. A camera having a compartment into which an element may be loaded and stored, said camera comprising:
    an elastically deformable sheet member which comprises a display surface and which is attachable to an inner wall face of said compartment; and
    holding members disposed on the inner wall face of said compartment for holding both ends of said sheet member,
    wherein said sheet member is adapted to be curled along said inner wall face, and attached and secured to said compartment by using said holding members to hold and control the resilience generated by curling said elastically deformable sheet member, in a manner such that the ends of said sheet member abut and press against said holding members.

12. The camera according to claim 11, wherein the display surface of said sheet member displays predetermined information in a visible format.

13. The camera according to claim 11, wherein the inner wall face of said compartment has a substantially cylindrical shape.

14. The camera according to claim 13, wherein said sheet member has a substantially cylindrical shape of such size that the sheet member is insertable into said compartment when the sheet member is attached to said compartment.

15. The camera according to claim 11, wherein the inner wall face of said compartment has a substantially curved shape.

16. A camera having a compartment into which an element may be loaded and stored, said camera comprising:

a camera main body having an opening and an inner wall face defining said compartment;

an elastically deformable sheet member which has a resilience to return from a curled state to an initial state, and which comprises a display surface and is attachable to the inner wall face defining said compartment; and two control holding members disposed on respective sides of the inner wall face of said compartment for holding a position of said sheet member by abutting and pressing on both ends of said sheet member;

wherein when said sheet member is curled and attached along said inner wall face, said sheet member is secured in a curled state by using said holding members to hold and control the resilience generated by curling said elastically deformable sheet member.

17. The camera according to claim 16, wherein said sheet member is made of a resin material or metal material.

18. A camera having a compartment into which an element may be loaded and stored, said camera comprising:

a camera main body having an opening and an inner wall face defining said compartment;

an elastically deformable sheet member which has a resilience to return from a curled state to an initial state, and which comprises a display surface and is attachable to the inner wall face defining said compartment;

two control holding sections disposed on respective sides of the inner wall face of said compartment for holding a position of said sheet member by abutting and pressing on both ends of said sheet member; and a receiving face section formed on the inner wall face of said compartment and between said two control holding sections for abutting on and receiving a surface of said sheet member;

wherein when said sheet member is curled and attached along said inner wall face, said sheet member is secured in a curled state by using said holding members and said receiving face section to hold and control the resilience generated by curling said elastically deformable sheet member.

19. A camera comprising:

a camera main body having an opening;

holding members provided at end portions of said opening;

an elastically deformable sheet member for covering an inner wall surface of said camera main body; and a wall section which is formed around said opening and which defines said inner wall surface of the camera main body;

wherein said sheet member is attachable to said inner wall surface of said camera main body by elastic deformation to abut and press against said holding members, without gluing; and wherein said wall section comprises concavely arranged steps, and said holding members comprise side faces of two of said steps.

* * * * *